United States Patent

Blech et al.

[15] 3,666,000
[45] May 30, 1972

[54] TORQUE TRANSMISSION SYSTEM FOR A GAS TURBINE HEAT EXCHANGER

[72] Inventors: Joab J. Blech, Oak Park; Antoni Paluszny, Ann Arbor, both of Mich.

[73] Assignee: Ford Motor Company, Dearborn, Mich.

[22] Filed: Oct. 19, 1970

[21] Appl. No.: 81,949

[52] U.S. Cl. ..................................165/8, 64/15 R, 64/27 R, 74/446, 165/10, 267/147, 267/181
[51] Int. Cl. .........................................................F28d 19/04
[58] Field of Search ..................165/8, 10; 74/439, 446, 443; 64/27 R, 27 F, 15 R; 267/181, 1.5, 147, 182; 152/17, 28

[56] References Cited

UNITED STATES PATENTS

| | | | |
|---|---|---|---|
| 3,363,478 | 1/1968 | Lanning | 165/8 X |
| 2,755,079 | 7/1956 | York et al. | 267/147 |
| 3,430,687 | 3/1969 | Wardale | 165/8 |
| 2,869,858 | 1/1959 | Hartwell | 267/147 |

*Primary Examiner*—Albert W. Davis, Jr.
*Attorney*—John R. Faulkner and Robert W. Brown

[57] ABSTRACT

A torque transmission system for a gas turbine heat exchanger assembly comprising a rotary heat exchanger formed of a ceramic honeycomb structure and driven by annular metal driving means coupled to the heat exchanger periphery by a wire mesh located between the inner surface of the annular driving means and the periphery of the heat exchanger. The wire mesh transmits torque from the annular metal driving means to the heat exchanger and may comprise a plurality of interwoven wires. The wire mesh may be corrugated and preferably has a thermal coefficient of linear expansion greater than that of the annular metal driving means. The wire mesh may comprise a plurality of plaited layers of interwoven wire.

11 Claims, 3 Drawing Figures

Patented May 30, 1972  3,666,000
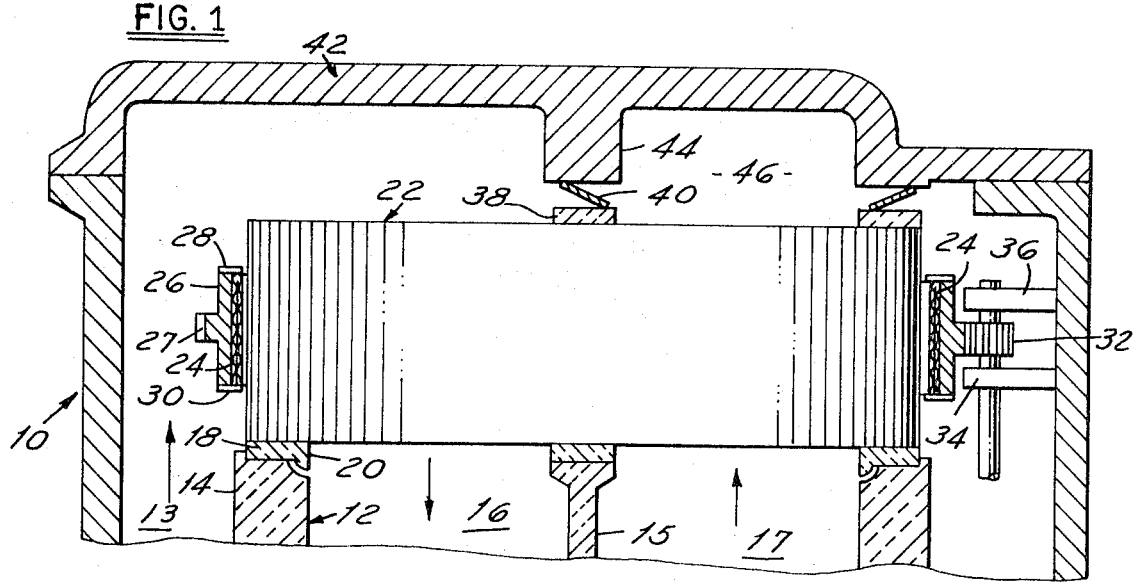
FIG. 1
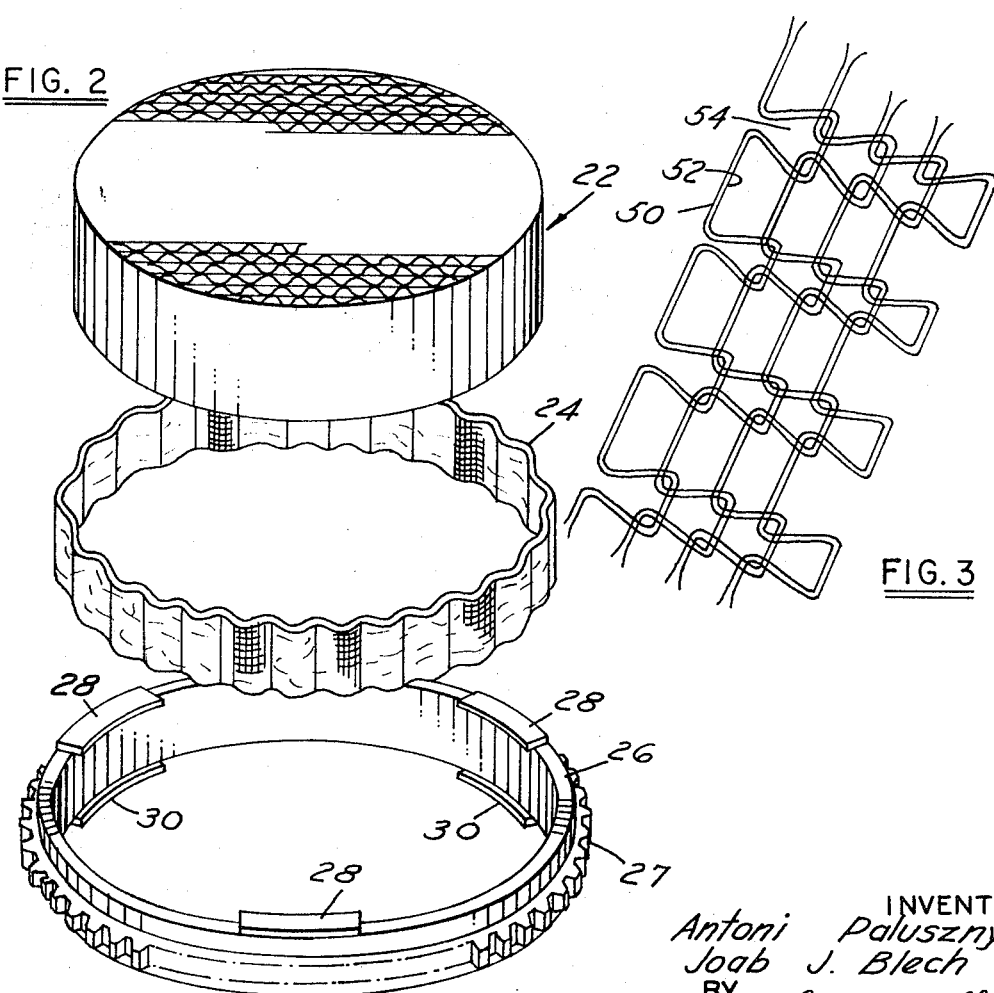
FIG. 2
FIG. 3
INVENTORS
Antoni Paluszny
Joab J. Blech
BY John R. Faulkner
Robert W. Brown
ATTORNEYS

TORQUE TRANSMISSION SYSTEM FOR A GAS TURBINE HEAT EXCHANGER

BACKGROUND OF THE INVENTION

This invention relates to a system for transmitting torque from annular driving means to a rotary heat exchanger, and, more particularly, to a rotary heat exchanger made from a ceramic material having a low thermal coefficient of expansion. The system is intended for use in a gas turbine engine.

In a gas turbine engine, an air-fuel mixture is burned in a combustion chamber to form hot gases which are directed to a turbine wheel to produce rotary motion of an engine output shaft. After these gases have impinged upon the turbine wheel, and prior to their being exhausted from the engine, it is desirable to extract as much heat energy as possible. The efficiency of the gas turbine engine is increased by transferring the heat energy extracted from these exhaust gases to the compressed intake air prior to its mixture with the fuel and entry into the combustion chamber. The heat exchanger that is used to accomplish this energy transfer which raises the temperature of the incoming compressed air is called a regenerator.

A heat exchanging system which employs a rotating regenerator core has been found to be particularly suitable for gas turbine engines. Typically, this regenerator core is made from a ceramic material and is disc-shaped and porous to gases which flow essentially parallel to the rotational axis of the core. The porous, ceramic regenerator core rotates in a housing which is divided into a plurality of passages. Hot exhaust gases and the cooler compressed incoming air pass through these passages and through the porous regenerator core. The exhaust gases heat the regenerator core, and the regenerator core, in turn, transfers the heat energy which it absorbs to the cooler compressed incoming air. In this manner, heat transfer results.

Means must be provided for rotating the ceramic regenerator core. Typically, this is accomplished by annular metal driving means in the form of a ring gear which surrounds the exterior periphery of the regenerator core. Because the annular metal driving means and the ceramic regenerator core have substantially different thermal coefficients of expansion, they should not be directly in contact with one another. For this reason, the annular driving means is spaced from the ceramic regenerator core, and means are provided for transmitting torque from the annular driving means to the regenerator core.

In the past, this torque transmission means has taken various forms. For example, in U.S. Pat. No. 3,363,478 issued to John G. Lanning, the torque transmission means comprises spring band segments tightly compressed between an annular ring gear and a ceramic rim of the regenerator core. In U.S. Pat. No. 3,430,687, issued to David J. S. Wardale, the torque transmission means is a plurality of bow-like spring elements. In U.S. Pat. No. 3,525,384 issued August 25, 1970, and assigned to the Ford Motor Company, the torque transmission means described is an elastomeric pad compressed between the inner surface of the annular driving means and the exterior periphery of the regenerator core.

SUMMARY OF THE INVENTION

In accordance with the invention, a novel torque transmission system for a gas turbine heat exchanger comprises a cylindrically-shaped ceramic regenerator core which is rotatably mounted in the engine. The core is porous to gases flowing substantially parallel to the axis of rotation of the core, and the core is surrounded by annular metal driving means. The inner surface of the regenerator core is separated from the annular driving means by a space in which is located a wire mesh. The wire mesh is at least slightly compressed between the annular driving means and the ceramic regenerator core to provide frictional engagement therebetween and to transmit torque from the annular driving means to the regenerator core.

Preferably, the wire mesh is comprised of a plurality of layers of interwoven wire, which may be formed by doubling over or folding a layer of interwoven wire upon itself to form an accordian-like plaited structure. Also, it is preferable that the wire mesh be corrugated and that it be made from a material having a thermal coefficient of linear expansion greater than that of the annular metal driving means. Stainless steel has been found to be a suitable material for construction of the wire mesh. The wire from which the wire mesh is made may have a diameter of about 0.01 of an inch.

The invention will be better understood from a reading of the detailed description which follows and by reference to the drawings.

BRIEF DESCRIPTION OF THE DRAWINGS

FIG. 1 is a sectional elevational view of a portion of a gas turbine engine showing a heat exchanger equipped with an embodiment of the torque transmission system of the invention;

FIG. 2 is an exploded view of the regenerator core, an embodiment of the wire mesh of FIG. 1, and annular drive means in the form of a ring gear; and FIG. 3 is a pictorial view of a corrugated wire mesh constructed in accordance with the invention.

DETAILED DESCRIPTION

With reference to FIG. 1, a gas turbine engine containing the system of this invention has an essentially elliptical metal outer housing 10 that is open at the top of the regenerator portion. FIG. 1 is sectioned along the major diameter of the elipse. A smaller ceramic inner housing 12 is located inside housing 10 and terminates a short distance from the opening thereof. Inner housing 12 comprises an outer cylindrical wall 14 divided diametrically by a wall 15 into two semi-circular passages 16 and 17. Wall 14 forms an annular passage 13 between part of its circumference and housing 10. A solid ceramic rubbing seal 18 having the same shape as housing 12 is located on top of housing 12 where it is restrained from circular movement by fitting ribs 20 on the underside of seal 18 into corresponding slots on the top of housing 12. Seal 18 is made of a ceramic having good wearing properties, such as a nickel oxide - calcium fluoride combination, and can be formed integrally with inner housing 12.

A disc-shaped ceramic regenerator core 22 is mounted rotatably on top of seal 18. A wire mesh 24 contacts the entire periphery of the regenerator core 22. Wire mesh 24 contains a plurality of corrugations which form troughs and ridges that preferably run substantially parallel with the axis of the regenerator core. These troughs and ridges of the wire mesh 24 may be clearly seen in the exploded view of FIG. 2.

Annular metal driving means in the form of a ring gear 26 surrounds and is spaced from the ceramic regenerator core. The wire mesh 24 occupies the annular space thus formed and frictionally engages the inner surface of the ring gear 26 and the exterior periphery of the regenerator core 22. The ring gear 26 has a plurality of gear teeth 27 on its exterior surface. Retainers 28 and 30 restrain axial movement of the wire mesh 24. It is, of course, possible to attach the retainers 28 and 30 to the regenerator core 22 instead of to the ring gear 26. A pinion gear 32, supported by two bosses 34 and 36 projecting inwardly from the housing 10, meshes with the gear teeth 27 so that rotation of the pinion gear 32 drives the ring gear 26 and the regenerator core 22 coupled thereto for torque transmission by means of the wire mesh 24.

A D-shaped seal 38 has its straight portion located above the wall 15 and its semi-circular portion located above the semi-circular portion of housing 12 forming the passage 17 with the bottom of seal 38 in rubbing contact with the core 22. The seal 38 can be made of metal having a wearing surface on its lower side suitable for use on ceramics. A metal foil seal 40 is welded to the top inner edge of the seal 38.

The open portion of the outer housing 10 is covered by a metal cap 42. The cap 42 has a downwardly projecting ridge 44 aligned with diametrical wall 15 of the inner housing. The ridge 44 bears on the straight portion of foil seal 40 and a portion of the circumference of the cap 42 bears on the semi-circular portion of foil seal 40. The foil seal 40 is made of spring stock and is deflected by the cap 42 to urge the regenerator core 22 downwardly onto the seal 18. Rotation of the seal 38 is restrained by projecting fingers (not shown) on the cap 42 or the housing 10.

During engine operation, relatively cool air from the compressor flows up passage 13 and is turned downwardly by the cap 42 into the porous regenerator core 22. The air passes through the left portion of the regenerator core 22 and continues downward through the passage 16 to the engine combustion chamber (not shown). Hot combustion gases from the combustion chamber pass initially through the turbine wheels (not shown) and then flow upward through the passage 17, the portion of the regenerator core 22 above the passage 17, and into the space 46 which exhausts the gases to the atmosphere.

The temperature of the gases in the passage 17 is extremely high and can exceed 1,800° F. A considerable portion of this heat is transferred by the rotating regenerator core 22 to the air passing through the sector of the core above the passage 16. Relatively cool air from the passage 13 surrounds the exterior periphery of the core 22 to provide a relatively cool environment for the wire mesh 24 and the ring gear 26.

With particular reference to FIG. 2, there is shown an exploded view of the torque transmission system for the gas turbine heat exchanger. The regenerator core 22 is formed from a series of alternating flat and corrugated ceramic layers. Thus, the regenerator core is porous to gases flowing in a substantially axial direction. The wire mesh 24 preferably is formed from a plurality of layers of interwoven wire, which may, for example, have a diameter of about 0.01 of an inch. This preferred form for the wire mesh 24 may be formed by doubling or folding over upon itself at least once an interwoven wire material. After the plurality of layers are formed, the wire mesh thus formed is corrugated and is wrapped around the regenerator core 22 and its ends are bonded or fastened together. This assembly is then placed within the ring gear 26 and the retainer elements 28 and 30 are added. These retainer elements 28 and 30 may be welded or otherwise attached to the ring gear 26.

With reference to FIG. 3, there is shown a pictorial view of an interwoven wire material from which the wire mesh 24 may be constructed. This material is formed from wires 50 and 52 which run parallel with one another and which form a multitude of U-shaped portions 54 which are interconnected with other pairs of parallel wires. The wire mesh is made from a material, such as stainless steel, having a thermal coefficient of linear expansion greater than that of the metal from which the ring gear 26 is made. This tends to increase the frictional engagement force between the annular ring gear 26 and the regenerator core 22 as the temperature of the wire mesh increases during operation of the engine. Axial elongation of the wire mesh 24 is limited by the retainers 28 and 30.

Based upon the foregoing description of the invention, what is claimed and desired to be protected by Letters Patent is:

1. A torque transmission system for a gas turbine heat exchanger, which comprises: a cylindrically-shaped regenerator core rotatably mounted in said engine, said core being porous to gases flowing substantially parallel to the axis of rotation of said core; annular metal driving means surrounding said regenerator core, said annular driving means having a coefficient of thermal expansion substantially greater than that of said regenerator core and having an inner surface separated from the periphery of said regenerator core to form an annular space between said annular driving means and said regenerator core; and a wire mesh in said annular space for allowing said annular driving means to transmit torque to said regenerator core, said wire mesh being constructed so as to provide resilient, frictional engagement with the inner surface of said annular driving means and with the periphery of said regenerator core.

2. A torque transmission system in accordance with claim 1, wherein said wire mesh has a corrugated configuration.

3. A torque transmission system in accordance with claim 1, wherein said wire mesh is comprised of a plurality of layers of interwoven wire.

4. A torque transmission system in accordance with claim 1, wherein said wire mesh is made from stainless steel.

5. A torque transmission system in accordance with claim 1, wherein said wire mesh is made from a metal having a thermal coefficient of linear expansion substantially greater than that of said annular metal driving means.

6. A torque transmission system in accordance with claim 2, wherein said corrugations form troughs and ridges which run substantially parallel with the axis of said regenerator core.

7. A torque transmission system in accordance with claim 3, wherein said plurality of layers of interwoven wire comprise an interwoven wire material doubled over upon itself at least once to form a plait.

8. A torque transmission system in accordance with claim 3, wherein said plurality of layers are corrugated.

9. A torque transmission system in accordance with claim 3, wherein said wire in said plurality of layers of interwoven wire is stainless steel.

10. A torque transmission system in accordance with claim 3, which further comprises means attached to said annular driving means for restraining axial movement of said wire mesh.

11. A torque transmission system in accordance with claim 3, wherein said wire has a diameter of about 0.01 of an inch.

* * * * *